Aug. 31, 1926.
E. BEARD
MITER GAUGE
Filed Nov. 27, 1925
1,597,756
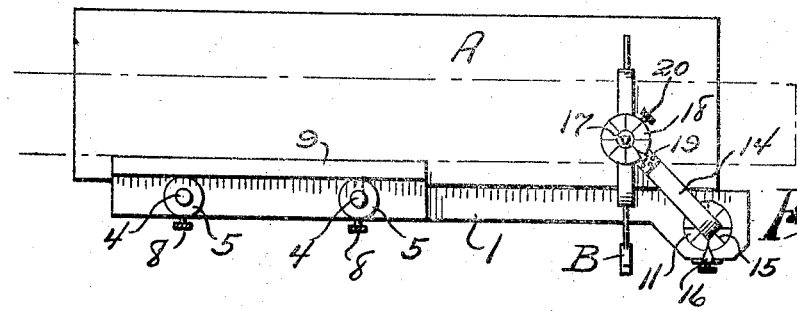
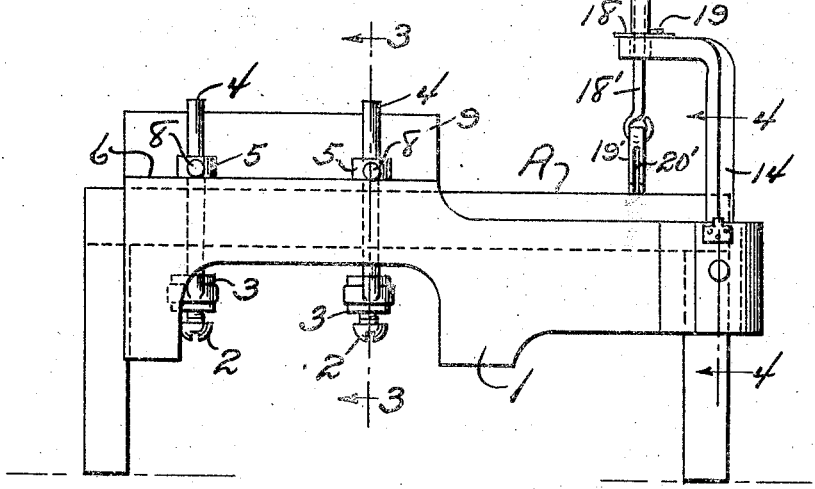
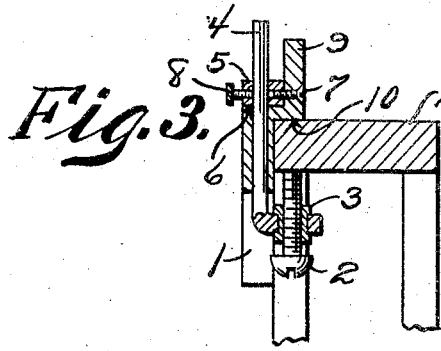
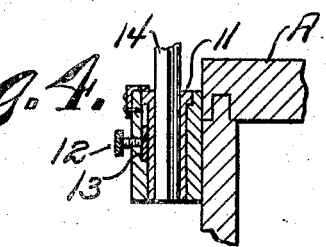
Ellsworth Beard
INVENTOR
BY Victor J. Evans
ATTORNEY
WITNESS:

Patented Aug. 31, 1926.

1,597,756

UNITED STATES PATENT OFFICE.

ELLSWORTH BEARD, OF EVANSTON, WYOMING.

MITER GAUGE.

Application filed November 27, 1925. Serial No. 71,766.

This invention relates to a miter gauge, the general object of the invention being to provide an arm which has its horizontal part adjustable in a horizontal plane with a vertically movable rod carried by said horizontal part and having the saw guide pivoted to its lower end with an adjustable sleeve which is rotatably supported on the arm.

Another object of the invention is to provide a support for the arm which is provided with a straight edge and having means for clamping it to a work bench.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawing wherein like characters denote like or corresponding parts throughout the several views, and in which:—

Figure 1 is a plan view of the invention attached to a work bench.

Figure 2 is an elevation.

Figure 3 is a section on line 3—3 of Figure 2.

Figure 4 is a section on line 4—4 of Figure 2.

Figure 5 is a view of the saw guide.

In these views, 1 indicates a support which is adapted to be clamped to the front edge of a work table A by means of the clamping screws 2 carried by the nuts 3 which are supported in the horizontal parts of the vertically arranged rods 4 which pass through holes in the support 1 and through the collars 5 which are seated on a horizontal shoulder 6 on the support and which are fastened to the support by the screws 7. Set screws 8 clamp the rods in the collars 5. A straight edge 9 is offset from the top of the support and forms a lower shoulder 10 which seats upon the bench when the support is in position. The shoulder 10 and the ends of the screws 2 clamp the bench between them. A sleeve 11 is rotatably mounted in the front end of the support 1 and is frictionally held against rotary movement by means of the set screw 12 and the shoe 13. This sleeve has a square bore for receiving the lower end of an L-shaped arm 14 and said sleeve has a scale 15 on its top face with which a pointer 16 on the support 1 cooperates. The horizontal part of the arm 14 carries a sleeve 17 which is rotatably supported therein, and this sleeve is also provided with a scale 18 and a pointer 19 on the arm cooperates therewith. A set screw 20 holds the sleeve 17 in adjusted position. The sleeve 17 also has a squared bore which is slidingly engaged by a square rod 18′ to the lower end of which is pivoted a U-shaped saw guide 19′ which has the saw receiving slots 20′ in its limbs. One limb is made longer than the other, this long limb receiving the handle end of the saw, which is shown at B.

From the foregoing, it will be seen that the arm 14 can be adjusted on its vertical axis, so that the horizontal part thereof is adjustable in an arc of a circle, while the saw guide 19′ can also be turned about a vertical axis, through means of the sleeve 17 and rod 18′, both movements being determined by the scales. The entire device can be easily attached to or detached from a work bench and a part of the bracket 1 acts as a straight edge.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described, comprising a support, means for detachably connecting the same to a bench, a vertically arranged member rotatably mounted in the support, an arm carried by said member and having a horizontal part, a sleeve rotatably connected with the horizontal part of the arm, a rod vertically movable in the sleeve and a saw guide pivoted to the lower end of the rod.

2. A device of the class described, comprising a support, means for detachably connecting the same to a bench, a vertically arranged member rotatably mounted in the support, an arm carried by said member and having a horizontal part, a sleeve rotatably connected with the horizontal part of the arm, a rod vertically movable in the sleeve and a saw guide pivoted to the lower end of the rod, and scales for determining the amount of movement of the sleeve and of the member in the support.

3. A device of the class described, comprising a support, means for clamping the same to a work bench, a sleeve rotatably mounted in one end of the support, means for holding the sleeve in adjusted position, an arm carried by the sleeve and having a horizontal part at its upper end, a sleeve rotatably supported by said horizontal part, scales for the sleeves, a vertically movable rod carried by the second sleeve, a U-shaped saw guide pivoted to the lower end of the rod, the limbs of the guide being slotted to receive a saw.

In testimony whereof I affix my signature.

ELLSWORTH BEARD.